(12) United States Patent
Morikuni

(10) Patent No.: US 8,330,876 B2
(45) Date of Patent: Dec. 11, 2012

(54) PROJECTOR

(75) Inventor: Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 12/705,174

(22) Filed: Feb. 12, 2010

(65) Prior Publication Data

US 2010/0208149 A1 Aug. 19, 2010

(30) Foreign Application Priority Data

Feb. 13, 2009 (JP) ................. 2009-031840

(51) Int. Cl.
*H04N 9/31* (2006.01)
*H04N 5/64* (2006.01)

(52) U.S. Cl. .................. 348/744; 348/445; 348/747

(58) Field of Classification Search .................. 348/744, 348/747, 756, 441, 445, 556, 555, 913, 558; 353/30, 31, 69–70, 101, 102, 121, 122, 71; H04N 9/31, 5/64

See application file for complete search history.

(56) References Cited

U.S. PATENT DOCUMENTS

| 7,167,216 | B2 * | 1/2007 | Childers | 348/756 |
| 7,239,354 | B2 * | 7/2007 | Moritani | 348/445 |
| 7,461,939 | B2 * | 12/2008 | Allen et al. | 353/30 |
| 7,701,518 | B2 * | 4/2010 | Chung et al. | 348/747 |

FOREIGN PATENT DOCUMENTS

| JP | 04-170178 | 6/1992 |
| JP | 06-095063 | 4/1994 |
| JP | 06-253242 | 9/1994 |
| JP | 2002-258154 | 9/2002 |

* cited by examiner

*Primary Examiner* — Trang U Tran
(74) *Attorney, Agent, or Firm* — Maschoff Gilmore & Israelsen

(57) ABSTRACT

A projector includes: a light source; an image processing section adapted to perform an expansion process of an aspect ratio in either one of a horizontal direction and a vertical direction of an image to be formed by an image signal input; a light modulation element adapted to modulate light from the light source to form an image on which the expansion process is performed; a projection optical system adapted to project the image, formed by the light modulation element, on a projection surface; and an anamorphic zoom optical system adapted to be capable of changing a magnification ratio of the image with respect to a direction different from a direction, along which the expansion process is performed in the image processing section, out of the horizontal direction and the vertical direction.

9 Claims, 9 Drawing Sheets

PROJECTOR

BACKGROUND

1. Technical Field

The present invention relates to a projector. 2. Related Art

In general, although image signals with various aspect ratio (a ratio between the horizontal size of an image and the vertical size thereof) are input to a projector, since the size of a liquid crystal panel for forming the image is fixed, there arises a problem that the aspect ratio of the image signal input thereto and the aspect ratio of the liquid crystal panel do not match with each other.

In the case in which the aspect ratio of the input image signal and the aspect ratio of the liquid crystal panel do not match with each other, there are known the following methods for displaying the input image signal by the projector. As a general method (related art example 1), there can be cited a method of providing blank portions (black display portions) at the top and the bottom or the left and the right of the screen. In the case in which, for example, the image signal with the aspect ratio of 4:3 is displayed on the liquid crystal panel with the aspect ratio of 16:9, the blank portions are displayed on the left and the right of the screen.

This method results in inhibition of using the entire display area of the liquid crystal panel due to the blank portions provided at the top and the bottom or the left and the right thereof, thus incurring degradation in the resolution. Specifically, in the case in which the image signal with an aspect ratio of 4:3 is displayed on the liquid crystal panel with an aspect ratio of 16:9, the horizontal resolution is reduced about 25%. By contrast, in the case in which the image signal with an aspect ratio of 16:9 is displayed on the liquid crystal panel with an aspect ratio of 4:3, the vertical resolution is reduced about 25%. Further, since the area corresponding to the blank portion is also irradiated with the illumination light constantly, it faces the problem that the life of the liquid crystal panel is apt to be shorten. Further, it also faces the problem that the illumination efficiency is reduced due to the presence of the blank portion.

Therefore, in order for solving the problem described above, there is proposed a projector, which compresses the image with an aspect ratio of 16:9 in the horizontal direction to display it on the liquid crystal panel with an aspect ratio of 4:3, then restores the image, which has been compressed once, to be an image with an aspect ratio of 16:9 via an anamorphic lens, and then projects it with a projection lens (see, e.g., JP-A-4-170178 (Document 1)). When the projector displays the image with an aspect ratio of 4:3, the image is projected by the projection lens without making the image pass through the anamorphic lens by retracting a plane mirror, which is located between the anamorphic lens and the projection lens, from the optical path. By switching the plane mirror as described above, the two types of images with aspect ratios different from each other are displayed.

Further, there is proposed a projector, which selects the most appropriate one of two aspect ratios the projector can set, based on the aspect ratio of the input signal, and rotates the anamorphic lens in accordance therewith, thereby realizing switching of the two types of aspect ratios of the display image (see, e.g., JP-A-6-253242 (Document 2)).

In the projector described in the Document 1, although such degradation in the resolution as in the related art example 1 is not caused, there is required a mechanism for switching between the anamorphic lens and the normal projection lens with the plane mirror, which makes the structure problematically complicated.

Further, in the projector described in the Document 2, although the switching mechanism is simpler compared to the projector described in the Document 1, since it can only cope with the two types of aspect ratios, and moreover, the size of the liquid crystal panel is limited by the aspect ratio to be switched to, there arises the problem that freedom of design is dramatically reduced.

SUMMARY

An advantage of some aspects of the invention is to provide a projector capable of freely changing the aspect ratio without causing the degradation in the resolution, the reduction of the life, and the degradation in the illumination efficiency, and with a simple mechanism for switching the aspect ratio.

A projector according to an aspect of the invention includes a light source, an image processing section adapted to perform an expansion process of an aspect ratio in either one of a horizontal direction and a vertical direction of an image to be formed by an image signal input, a light modulation element adapted to modulate light from the light source to form an image on which the expansion process is performed, a projection optical system adapted to project the image, formed by the light modulation element, on a projection surface, and an anamorphic zoom optical system adapted to be capable of changing a magnification ratio of the image with respect to a direction different from a direction, along which the expansion process is performed in the image processing section, out of the horizontal direction and the vertical direction.

According to the projector of this aspect of the invention, since the image processing section performs the expansion process of the aspect ratio in either one of the horizontal direction and the vertical direction of the image, and the anamorphic zoom optical system can change the magnification ratio of the image with respect to the direction different from the direction along which the expansion process of the aspect ratio is performed in the image processing section out of the horizontal direction and the vertical direction, it is possible to display the image on the entire screen without disposing the blank portion on the upper and lower portions or the left and right portions of the screen, thus the degradation in the resolution, the reduction of the life, and the degradation in the illumination efficiency can be prevented. Further, since the plane mirror or the like for switching the aspect ratio becomes unnecessary, the switching structure can be prevented from becoming complicated. Further, since the magnification ratio of the image can be changed by the anamorphic zoom optical system, it is possible to provide a projector capable of performing display with high resolution corresponding to the image signal with a different aspect ratio even if such a signal is input thereto.

It should be noted that according to the above expression of the aspects of the invention, the expansion process of the "aspect ratio" in either one of the horizontal direction and the vertical direction of the image is performed, and in view of the resolution, there can also be the case in which the expansion process of the "image" in both of the horizontal direction and the vertical direction is performed in order for displaying the image on the entire display area of, for example, the light modulation element, or the case in which the compression process of the "image" is performed depending on the image signal input.

In the projector according to this aspect of the invention, it is also possible that an aspect ratio detection section adapted to detect an aspect ratio of the image signal input is further provided, and the image processing section performs the expansion process of the image so that an aspect ratio of the image on which the expansion process has been performed and an aspect ratio of the light modulation element match with a result of the aspect ratio detection by the aspect ratio detection section.

According to this configuration, since the display is performed using the entire display area of the light modulation element, there can be realized the configuration with the highest efficiency, and in which the image processing section performs the expansion process of the image with the most appropriate magnification ratio based on the information of the image signal input thereto.

Alternatively, it is also possible to adopt the configuration in which there is further provided an anamorphic magnification calculation section adapted to calculate a magnification ratio of the anamorphic zoom optical system based on a moving distance of a lens constituting the anamorphic zoom optical system, and the image processing section performs the expansion process of the image based on a calculation result of the magnification ratio by the anamorphic magnification calculation section.

According to this configuration, it is possible to cope with the case in which, for example, the user forcibly changes the magnification ratio of the anamorphic zoom optical system, and it is possible to realize the configuration of performing the expansion process of the image with the most appropriate magnification ratio corresponding to the magnification ratio of the anamorphic zoom optical system.

In the projector according to this aspect of the invention, it is desirable that each of the projection optical system and the anamorphic zoom optical system is provided with a focus drive section adapted to adjust focus of the image.

According to this configuration, since the focus of the image on the projection surface is adjusted by the actions of the respective focus drive sections of the projection optical system and the anamorphic zoom optical system, a clear image can be obtained.

In the projector according to this aspect of the invention, it is also possible that there is further provided a lens position detection section adapted to detect a position of a lens constituting each of the projection optical system and the anamorphic zoom optical system, and each of the focus drive sections performs adjustment of the focus based on a result of the lens position detection by the lens position detection section.

According to this configuration, it is possible to interlock the focus drive section of the projection optical system and the focus drive section of the anamorphic zoom optical system using the detection result from the lens position detection section incorporated in the projector, a high definition projector can be realized.

Alternatively, it is also possible to adopt the configuration in which an imaging section adapted to shoot an image projected on the projection surface is further provided, and each of the focus drive sections performs adjustment of the focus based on a result of the shooting of the image by the imaging section.

According to this configuration, it becomes possible to automatically adjust the focus of the both based on the shooting result of the imaging section even in the case in which the zoom mechanisms of the projection optical system and the anamorphic zoom optical system are complicated, and it is difficult to interlock with each other, thus the high definition projector can be realized.

In the projector according to this aspect of the invention, it is also possible that the anamorphic zoom optical system is adapted to be capable of rotating around an own optical axis.

Further, in this case, it is desirable that the aspect ratio of the light modulation element is 1:1.

According to this configuration, it is possible to change the magnification ratio in both of the horizontal direction and the vertical direction only by using one type of anamorphic zoom optical system by rotating the anamorphic zoom optical system. Therefore, it can cope with the case in which the magnification ratio of the anamorphic zoom optical system is required to be set to be equal to or smaller than one using the combination of the image signal and the light modulation element, and the flexibility of the case in which a variety of image signals is input can be enhanced. In this case, if the aspect ratio of the light modulation element is 1:1, the same magnification ratio can be realized in both of the case in which the projector is mounted vertically and the case in which the projector is mounted horizontally, thus the projector with high flexibility independent of the mounting direction can be obtained.

In the projector according to this aspect of the invention, it is also possible to adopt the configuration in which the image processing section corrects distortion of the image as much as a correction amount set previously in accordance with a shape of the projection surface.

According to this configuration, it is possible to accordingly correct the distortion of the image in accordance with the type or purpose of the input signal, thus the projector capable of coping with a variety of types of input signals can be realized.

BRIEF DESCRIPTION OF THE DRAWINGS

The invention now be described with reference to the accompanying drawings, wherein like numbers reference like elements.

DESCRIPTION OF EXEMPLARY EMBODIMENTS

First Embodiment

Hereinafter, the projector according to a first embodiment of the invention will be explained with reference to FIGS. 1, 2A through 2D, 3A through 3C, 4A through 4D, 5, and 6.

The projector according to the present embodiment is an example of a liquid crystal projector adopting a liquid crystal panel as a light modulation element.

Figure 1:
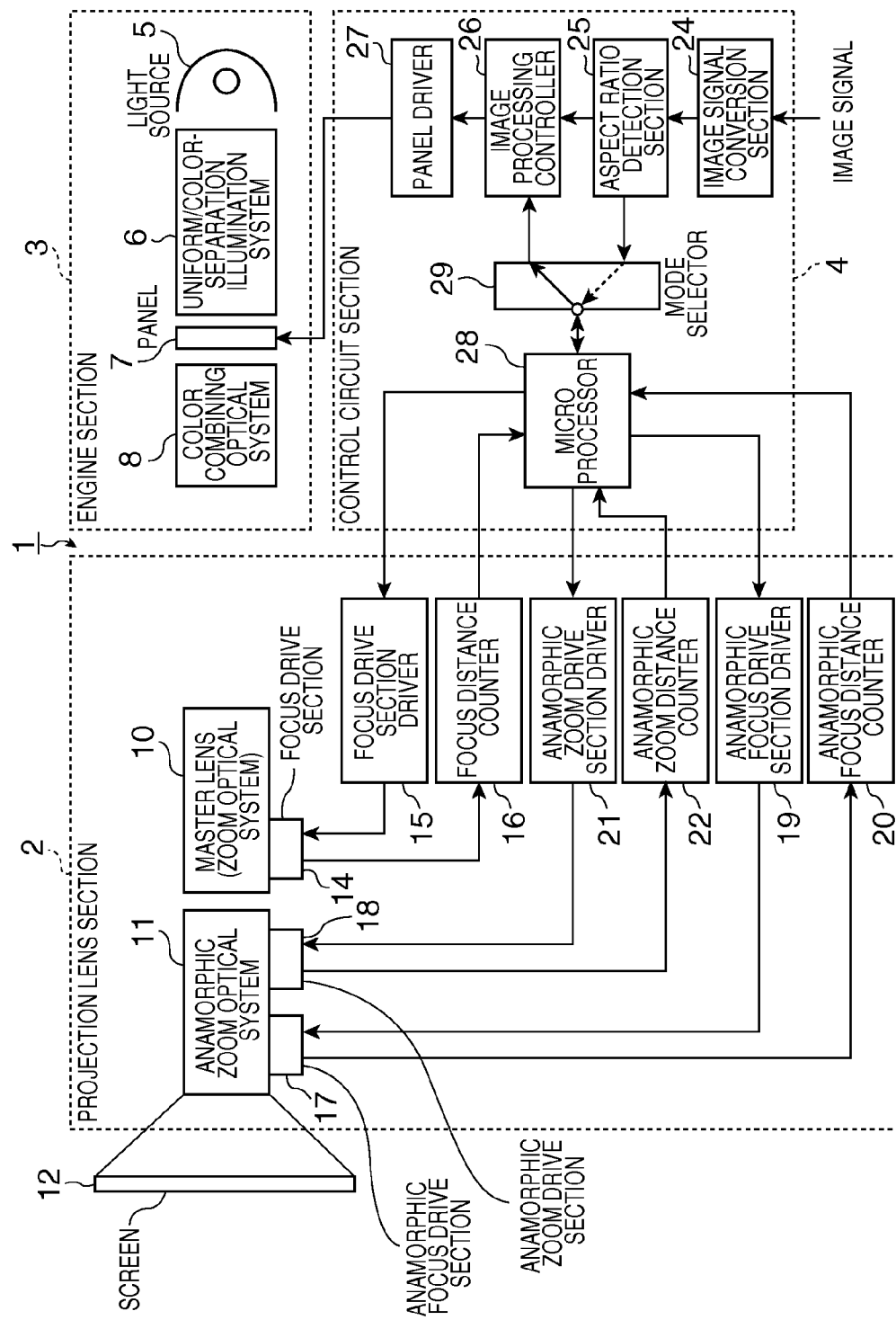
FIG. 1 is a schematic configuration diagram of a projector according to a first embodiment of the invention.
Figure 3A:
FIGS. 3A through 3C are diagrams for explaining one method for detecting an aspect ratio.
Figure 3B:
Figure 3C:
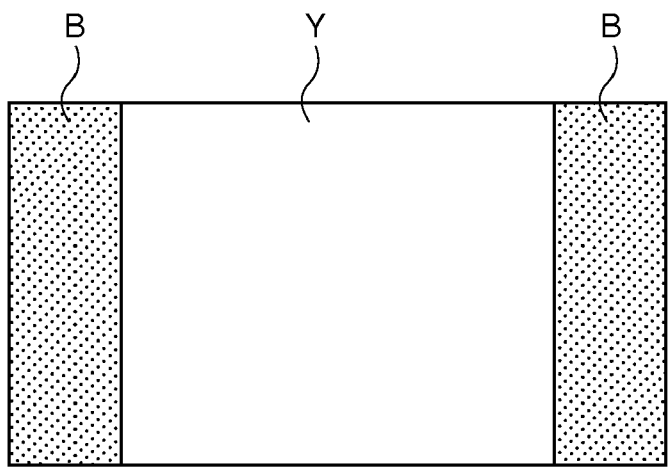
Figure 4A:
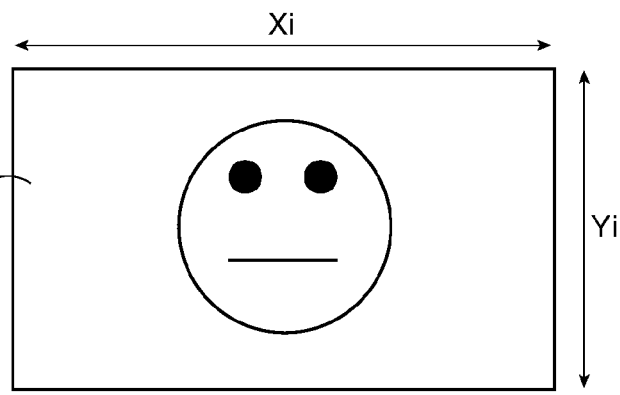
FIGS. 4A through 4D are diagrams for explaining the course of an expansion process.
Figure 5:
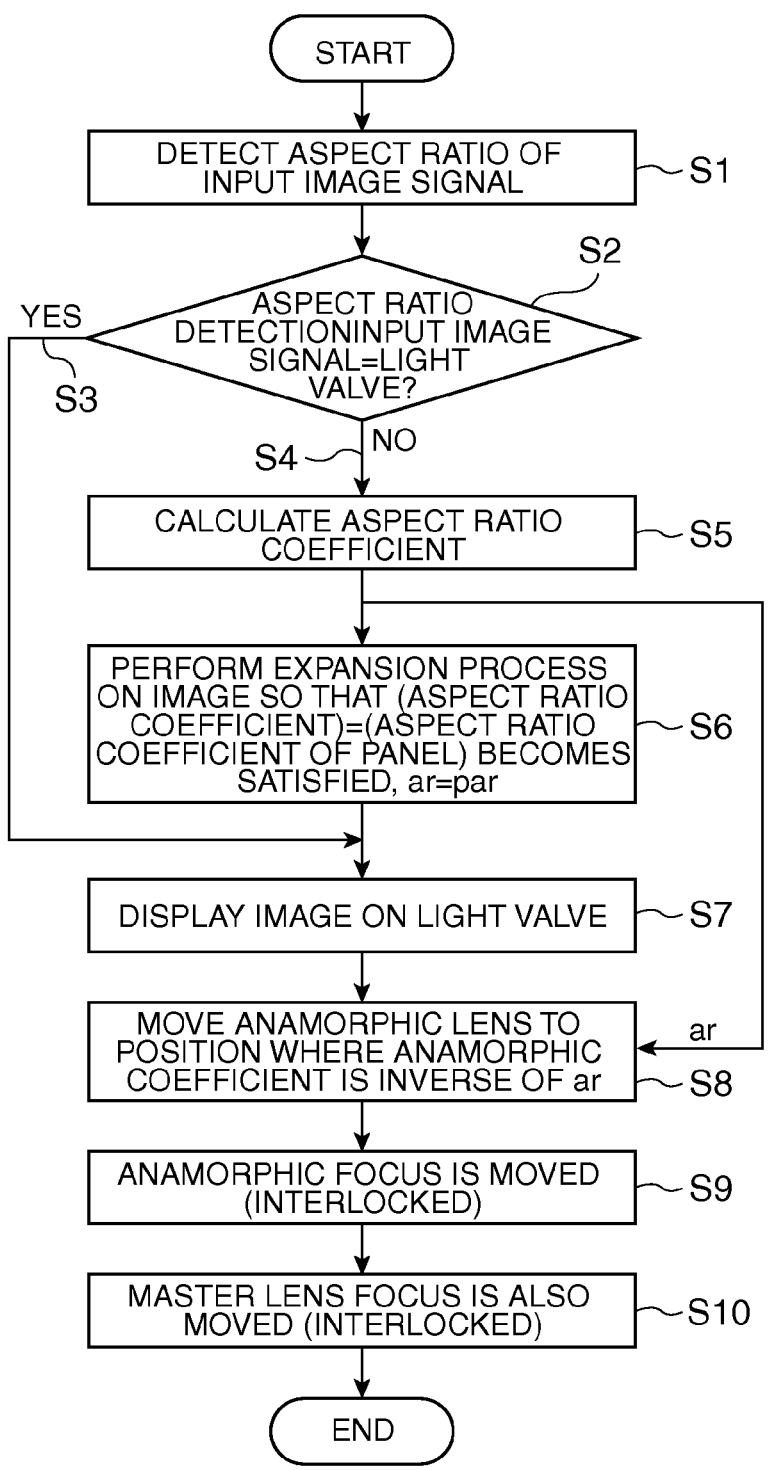
FIG. 5 is a flowchart showing processing steps in an input image signal priority mode.
Figure 6:
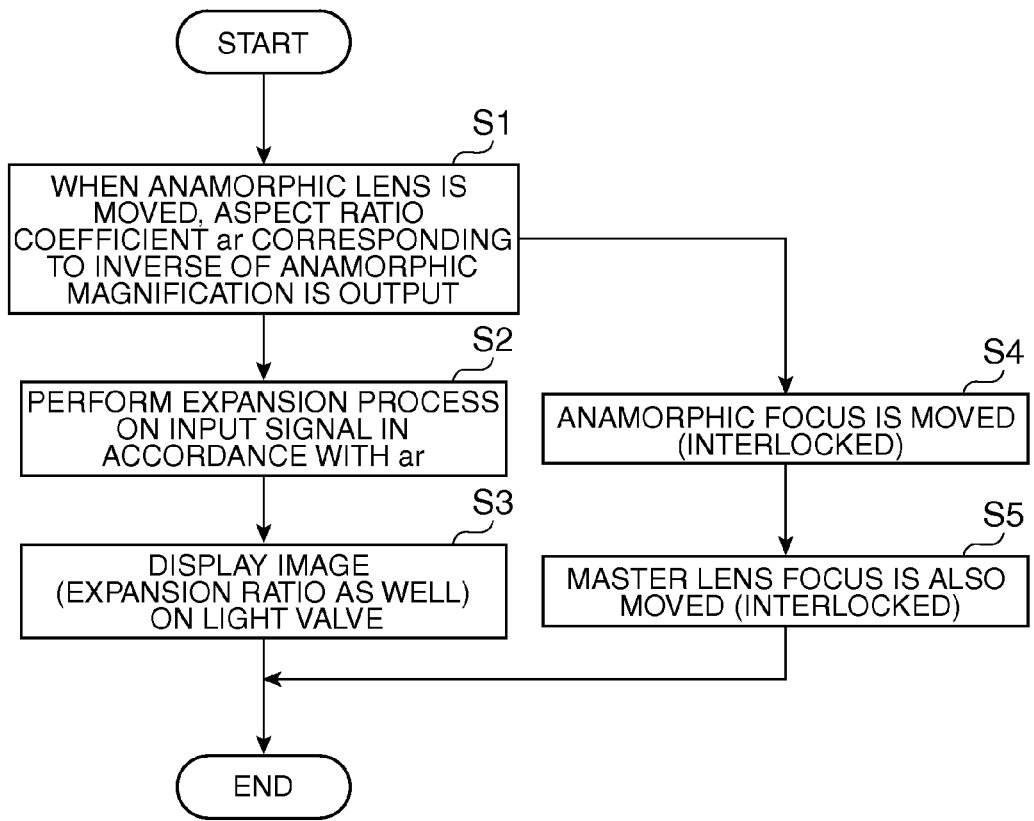
FIG. 6 is a flowchart showing processing steps in an anamorphic zoom priority mode.

FIG. 1 is a block diagram showing a schematic configuration of the projector according to the present embodiment. FIGS. 2A through 2D are diagrams showing a lens configuration of an anamorphic zoom optical system of the projector. FIGS. 3A through 3C are diagrams for explaining one method for detecting an aspect ratio. FIGS. 4A through 4D are diagrams for explaining the course of an expansion process. FIG. 5 is a flowchart showing processing steps in an input image signal priority mode. FIG. 6 is a flowchart showing processing steps in an anamorphic zoom priority mode.

As shown in FIG. 1, the projector 1 according to the present embodiment is provided with a projection lens section 2, an engine section 3, and a control circuit section 4. Although light source power supply section and so on are provided in addition thereto, in actuality, since these sections have no relationship with the invention, and therefore, illustrations and explanations therefor will be omitted.

The engine section 3 is provided with a light source 5, a uniform/color-separation illumination system 6, a transmissive liquid crystal panel 7 (light modulation element), and a color combining optical system 8. The uniform/color-separation illumination system 6 is composed of, for example, a fly-eye lens or a rod lens, and dichroic mirror. The color combining optical system 8 is formed of, for example, a dichroic prism.

When the light emitted from the light source 5 is transmitted through the uniform/color-separation optical system 6, the intensity distribution thereof is homogenized, and the light is separated into the colored light beams of R (red), G (green), and B (blue). Then, the each of the colored light beams is input to the liquid crystal panel 7, and the each colored light beams are modulated in accordance with the image signal input from the control circuit section 4, thus the image is formed. Therefore, although the engine section 3 is actually provided with three liquid crystal panels 7, a single liquid crystal panel 7 is only illustrated in FIG. 1. The colored light beams modulated by the respective liquid crystal panels 7 are combined by the color combining optical system 8, and emitted toward the projection lens section 2. Since the configuration described hereinabove is the same as that of the general liquid crystal projector of the related art, a detailed explanation therefor is omitted.

The projection lens section 2 is provided with a master lens 10 (a projection optical system) and an anamorphic zoom optical system 11, and in the present embodiment, the anamorphic zoom optical system 11 is disposed on the screen 12 side of the master lens 10. The master lens 10 here corresponds to a zoom lens or a fixed focal length lens of a general projector in the related art, and functions as the projection lens even alone. Further, the anamorphic zoom optical system 11 denotes a zoom optical system different in magnification between an X-axis (the horizontal axis) and a Y-axis (the vertical axis).

The anamorphic zoom optical system 11 will be explained with reference to FIGS. 2A through 2D.

Figure 2A:
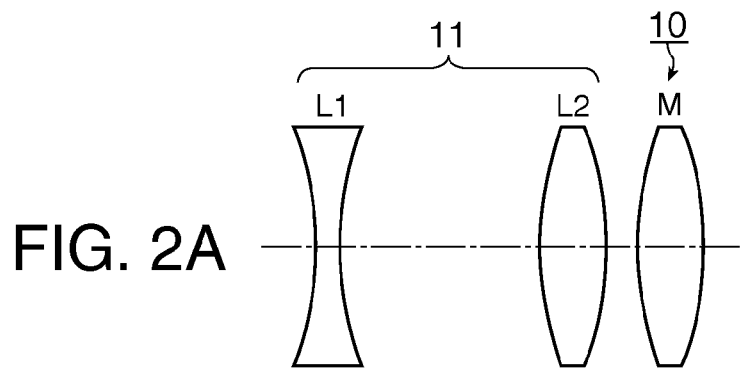
FIGS. 2A through 2D are diagrams showing a lens configuration of an anamorphic zoom optical system.
Figure 2B:
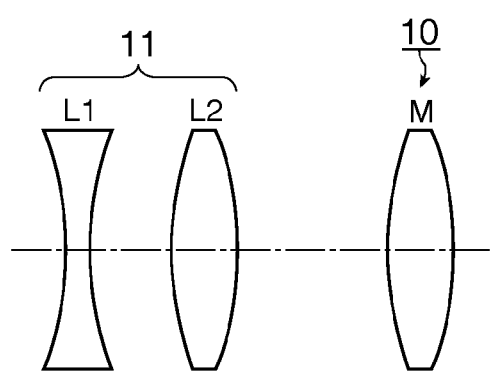
Figure 2C:
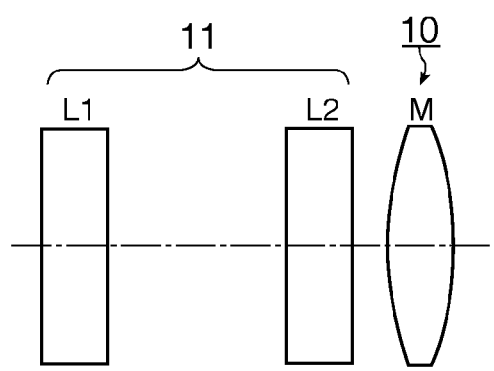
Figure 2D:
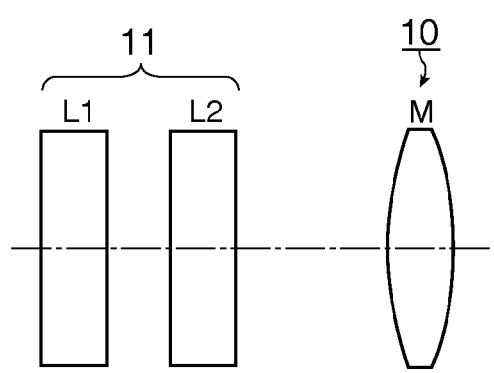

It is assumed here that the anamorphic zoom optical system 11 is composed of two lenses, and the master lens 10 is composed of a single lens, and the reference symbols L1, L2 in FIGS. 2A through 2D denote the anamorphic zoom lenses, and the reference symbol M therein denotes the master lens. FIGS. 2A and 2B are cross-sectional diagrams corresponding to the case of cutting them with a certain specific plane, and FIGS. 2C and 2D are cross-sectional diagrams corresponding to the case of cutting them with a plane perpendicular to the specific plane. Further, FIGS. 2A and 2C show the lens arrangement in the wide-angle position, and FIGS. 2B and 2D show the lens arrangement in the telephoto position.

As is understood from FIGS. 2A through 2D, the anamorphic zoom lenses L1, L2 each have a cylindrical surface, and can diffuse the light beyond the field angle of the master lens M in the direction of a certain specific axis on the one hand, but keep the field angle of the master lens M in the direction perpendicular to the certain specific axis on the other hand. The anamorphic lenses L1, L2 have an afocal relationship with each other, and become capable of magnification in only one direction without moving the field of the master lens M. It should be noted that FIGS. 2A through 2D are only for showing the basic configuration, and in order for providing the afocal relationship between the anamorphic lenses L1, L2 in both of the wide-angle position and the telephoto position, it is required in actuality that each of the anamorphic lenses L1, L2 has a configuration composed of a plurality of lenses, and is moved individually.

Going back to FIG. 1, the master lens 10 is provided with a focus drive section 14. The focus drive section 14 moves a lens necessary for focus movement via a focus drive section driver 15 based on a focus movement amount designation signal output from the control circuit section 4. In this case, the distance of the lens is output from the focus drive section 14 based on a position detector such as an encoder attached to the lens mechanism (not shown), and is output to the control circuit section 4 as a focus present position signal by a focus distance counter 16 (a lens position detection section).

Further, the anamorphic zoom optical system 11 is provided with an anamorphic focus drive section 17 and an anamorphic zoom drive section 18. Similar to the master lens 10, the anamorphic focus drive section 17 moves a lens necessary for the focus movement via an anamorphic focus drive section driver 19 based on an anamorphic focus movement amount designation signal output from the control circuit section 4. In this case, the distance of the lens is output from the anamorphic focus drive section 17 based on a position detector such as an encoder attached to the lens mechanism, and is output to the control circuit section 4 as an anamorphic focus present position signal by an anamorphic focus distance counter 20 (a lens position detection section).

The anamorphic focus drive section 18 moves a lens necessary for zoom via an anamorphic zoom drive section driver 21 based on an anamorphic zoom movement amount designation signal output from the control circuit section 4. In this case, the distance of the lens is output from the anamorphic zoom drive section 18 based on a position detector such as an encoder attached to the lens mechanism, and is output to the control circuit section 4 as an anamorphic zoom present position signal by an anamorphic zoom distance counter 22 (a lens position detection section).

The control circuit section 4 is provided with an image signal conversion section 24, an aspect ratio detection section 25, an image processing controller 26 (an image processing section), a panel driver 27, a microprocessor 28, and a mode selector 29. The image signal conversion section 24 is for performing digital processing on the image signal input from a television, a video player, a personal computer, and so on. The aspect ratio detection section 25 is for detecting the aspect ratio of the image signal input thereto. The image processing controller 26 is for performing an expansion process on the image based on the aspect ratio thus detected. The panel driver 27 is for outputting the drive signal for displaying the image, on which the expansion process is executed, on the liquid crystal panel.

The microprocessor 28 controls a processing mode (a first processing mode) for transmitting a signal to the respective drivers of the anamorphic zoom optical system 11 and the master lens 10 in accordance with the aspect ratio signal input from the aspect ratio detection section 25, and a processing mode (a second processing mode) for calculating the aspect ratio signal based on the lens present position signal output from the respective counters of the anamorphic zoom optical system 11 and the master lens 10, and then transmitting the aspect ratio signal to the image processing controller 26. The mode selector 29 is a section for switching between the first processing mode and the second processing mode described above.

Then, a specific flow of the process will be explained.

As described above, the projector 1 according to the present embodiment is provided with the two processing modes. The first processing mode is a mode for driving the anamorphic lenses L1, L2 of the anamorphic zoom optical system 11 in accordance with the aspect ratio of the image signal input therein, thereby displaying the most appropriate image on the screen 12. The second processing mode is a mode in the case in which the anamorphic lenses L1, L2 are forcibly moved in a manual manner to change the magnification, and for displaying the image most appropriate to the magnification on the liquid crystal panel 7, thereby projecting the most appropriate image on the screen.

The first processing mode will be explained with reference to the flow chart shown in FIG. 5.

It is assumed that the mode selector 29 shown in FIG. 1 validates the channel indicated by the broken arrow, and invalidates the channel indicated by the solid arrow when the first processing mode is selected.

Firstly, the image signal output from a television, a Blu-ray disc player, a personal computer (PC), or the like is input to the image signal conversion section 24. Subsequently, the image signal converted into a digital signal is input to the aspect ratio detection section 25. The aspect ratio detection section 25 detects (step S1 shown in FIG. 5) the aspect ratio of the image signal in two types of methods explained below.

The first method is a method for detecting the aspect ratio of the image signal itself input thereto. As shown in Table 1, in general, there is a plurality of aspect ratios of 4:3, 16:9, . . . , in accordance with the type of the image signal. Here, the aspect ratio is expressed as follows.

(aspect ratio)=(horizontal size $Xi$):(vertical size $Yi$)

TABLE 1

|  | ASPECT RATIO COEFFICIENT:ar | ASPECT RATIO | SIGNAL NAME |
| --- | --- | --- | --- |
| PICTURE | 1.33 | 4:3 | STANDARD 480P |
| PICTURE | 1.78 | 16:9 | WIDE 480P, 720P, 1080P, DVD |
| PC | 1.25 | 5:4 | SXGA |
| PC | 1.33 | 4:3 | VGA, SVGA, XGA, SXGA+, UXGA, QXGA, QUXGA |
| PC | 1.60 | 8:5 | WSVGA, WXGA+, WSXGA+, WUXGA, WQXGA |
| PC | 1.67 | 5:3 | WVGA, WXGA |
| PC | 2.13 | 32:15 | UWVGA, UWSVGA |

Although in Table 1, the aspect ratio is detected assuming that the entire area of the signal is an effective display area, some of the picture signals are each provided with a blank area (a black display area) in a part of the signal, and defines the rest of the signal as the effective display area. The second method intends to detect the aspect ratio only with the effective display area.

FIGS. 3A through 3C show some examples of the effective display area. Although it is possible in the case of FIG. 3A to detect the aspect ratio regarding the entire screen area as the effective display area Y, since the area other than the effective display area Y in the center thereof is recorded with no signal (or a "black" signal) as the blank area B in the cases of FIGS. 3B and 3C, it is required to detect the aspect ratio only in the effective display area Y except the blank area B. Therefore, in the cases of FIGS. 3B and 3C, the aspect detection section 25 detects only the effective display area Y to determine the aspect ratio.

An example of the case in which the aspect ratio of the entire area of the input signal and the aspect ratio (a recording aspect ratio) of the effective display area are different from each other will be shown in Table 2. In particular, in the case of the picture type image signals shown in Table 2, the image signal compliant with the standard of a medium or a broadcast wave is often input. Therefore, the second method for detecting the aspect ratio becomes indispensable.

TABLE 2

|  | ASPECT RATIO COEFFICIENT:ar | ASPECT RATIO | SIGNAL NAME |
| --- | --- | --- | --- |
| PICTURE | 1.33 | 4:3, 16:9 | STANDARD 480P |
| PICTURE | 1.66 | 16:9 | EUROPEAN VISTA |
| PICTURE | 1.78 | 16:9 (4:3) | WIDE 480P, 720P, 1080P, DVD |
| PICTURE | 1.85 | 16:9 | AMERICAN VISTA |
| PICTURE | 1.8963 | 16:9 | 2K1K, 4K2K |
| PICTURE | 2.35 | 16:9 | CINEMA SCOPE |

Figure 4B:
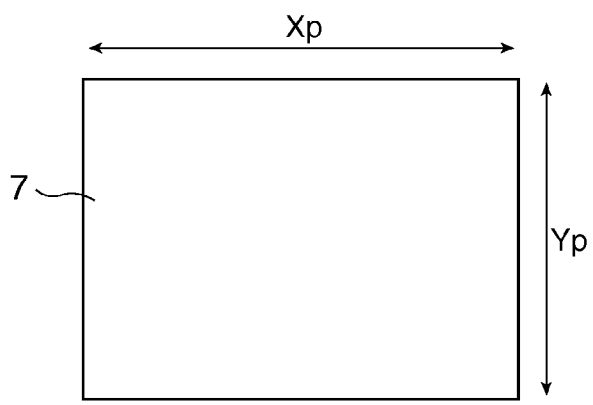

Here, since the aspect ratio Xp:Yp of the liquid crystal panel 7 for displaying the image is known previously as shown in FIG. 4B, the microprocessor 28 compares (step S2 shown in FIG. 5) the aspect ratio Xi:Yi detected by the aspect ratio detection section 25 and the aspect ratio Xp:Yp of the liquid crystal panel 7 with each other.

Here, in the case (step S3 shown in FIG. 5) in which the aspect ratio Xi:Yi of the image signal and the aspect ratio Xp:Yp of the liquid crystal panel 7 are identical to each other, the image is directly displayed (step S7 shown in FIG. 5) on the liquid crystal panel 7 without executing the expansion process.

On the other hand, in the case (step S4 shown in FIG. 5) in which the aspect ratio Xi:Yi of the image signal and the aspect ratio Xp:Yp of the liquid crystal panel 7 are different from each other, the aspect ratio detection section 25 calculates (step S5 shown in FIG. 5) an aspect ratio coefficient ar of the image signal along the following expression.

$ar=Xi/Yi$

The aspect ratio coefficient ar is also shown in Table 1 and Table 2 in addition thereto. Further, an aspect ratio coefficient "par" of the liquid crystal panel 7 is stored previously along the following expression.

$par=Xp/Yp$

Further, the aspect ratio detection section 25 transmits the aspect ratio coefficient ar of the image signal thus calculated, to the microprocessor 28 via the mode selector 29.

When the aspect ratio detection section 25 calculates the aspect ratio coefficient ar of the image signal, the image processing controller 26 performs (step S6 shown in FIG. 5) the expansion process of the image so that the aspect ratio coefficient ar of the image signal becomes equal to the aspect ratio coefficient "par" of the liquid crystal panel 7. By matching the aspect ratio coefficient ar of the image signal and the aspect ratio coefficient "par" of the liquid crystal panel 7 with each other, the image becomes to be displayed on the entire area of the liquid crystal panel 7.

Figure 4C:
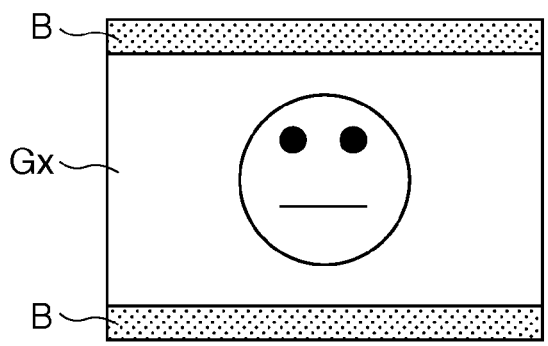
Figure 4D:
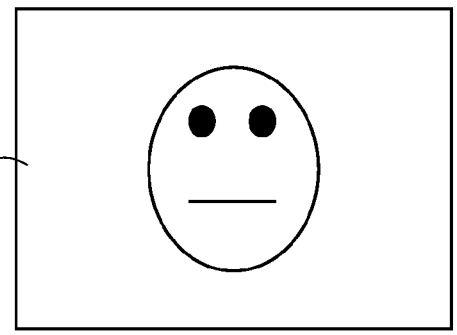

FIGS. 4A through 4D are diagrams for explaining the course of the expansion process, wherein FIG. 4A is an image obtained from the image signal itself, FIG. 4B is a diagram showing the liquid crystal panel 7, FIG. 4C is a diagram showing the display image of the related art, and FIG. 4D is a diagram showing the image on which the expansion process of the present embodiment has been executed.

In the case of displaying the image G1 corresponding to the image signal shown in FIG. 4A on the liquid crystal panel 7 shown in FIG. 4B, since the image G1 is horizontally longer than the liquid crystal panel 7, the relationship between the aspect ratio coefficient ar of the image signal and the aspect ratio coefficient "par" of the liquid crystal panel 7 satisfies ar>par.

In this case, as shown in FIG. 4C, in the display method of the related art, the blank areas B are provided in the top and bottom portions of the liquid crystal panel 7 to display the horizontally long image Gx. In contrast, in the display method of the present embodiment, the image signal is expanded in the vertical direction so that the vertical size Yi is increased relatively to the horizontal size Xi as shown in FIG. 4D, and that the relationship between the aspect ratio coefficient ar of the image signal and the aspect ratio coefficient "par" of the liquid crystal panel 7 satisfies ar=par, thereby displaying the image G2. The image processing controller 26 outputs the image signal, on which the expansion process is thus performed, to the liquid crystal panel 7 via the panel driver 27, and the liquid crystal panel 7 performs the display (step S7 shown in FIG. 5).

In other words, according to the display method of the present embodiment shown in FIG. 4D, since the blank area B, which is provided in the display method of the related art shown in FIG. 4C, is not provided, the light applied on the liquid crystal panel 7 can effectively be used. Further, the areas corresponding to the blank areas B in the related art method shown in FIG. 4C do not absorb the light in the method of the present embodiment shown in FIG. 4D, the durability is improved, and the reliability of the liquid crystal panel 7 is enhanced. Further, since the areas corresponding to the blank areas B are also used for display, the resolution can be improved compared to the related art. Moreover, since the problem of a grayish black picture in the blank area B can be eliminated, the image with clearer black can be realized.

Subsequently, the microprocessor 28 transmits the drive signal necessary for the zoom drive for performing the magnification in one direction with a magnification ratio (hereinafter referred to as an anamorphic magnification) corresponding to the inverse of the aspect ratio coefficient ar to the anamorphic zoom drive section 18 via the anamorphic zoom drive section driver 21 based on the aspect ratio coefficient ar of the image signal input from the aspect ratio detection section 25. The anamorphic zoom drive section 18 receives the drive signal, and moves the anamorphic lens by a distance corresponding to the anamorphic magnification to magnify the image G2, which is obtained by the expansion process as shown in FIG. 4D, in the horizontal direction, thereby restoring (step S8 shown in FIG. 5) the original aspect ratio as shown in FIG. 4A.

Subsequently, the microprocessor 28 transmits the signals to the respective focus drive sections 17, 14 of the anamorphic zoom optical system 11 and the master lens 10, in order for adjusting the focus defocused due to the movement of the anamorphic lenses L1, L2. Specifically, the microprocessor 28 transmits the signals to the anamorphic focus drive section driver 19 and the focus drive section driver 15 of the master lens 10 in view of the relation between the anamorphic magnification and the focus set previously in the microprocessor 28, and the respective focus drive sections 17, 14 of the anamorphic zoom optical system 11 and the master lens 10 move (steps S9, S10 shown in FIG. 5) the lenses necessary for the focus adjustment. In this case, as shown in FIG. 1, it is preferable to count the present lens position using the anamorphic focus distance counter 20 and the focus distance counter 16, and to drive the lenses while performing feedback by the microprocessor 28.

It should be noted that it is possible to adopt a configuration in which the master lens 10, and the anamorphic lenses L1, L2 are interlocked with each other using, for example, a cam mechanism. In this case, either one of the anamorphic focus drive section 17 and the focus drive section 14 of the master lens 10 becomes unnecessary.

The image display in the first processing mode is completed through the course described above, thus the most appropriate image can be displayed on the screen 12.

The second processing mode will be explained with reference to the flow chart shown in FIG. 6.

The second processing mode is a mode for displaying the image most appropriate to the magnification on the liquid crystal panel 7, thereby projecting the most appropriate image on the screen 12 in the case in which, for example, the user forcibly moves the anamorphic lenses in a manual manner to change the magnification of the image.

It is assumed that the mode selector 29 shown in FIG. 1 validates the channel indicated by the solid arrow, and invalidates the channel indicated by the broken arrow when the second processing mode is selected.

The second processing mode is started in the state in which the anamorphic magnification, which has been set when the power has been switched off, is stored when powering on the projector 1, or in the case in which the image has already been projected in the first processing mode. This mode is a mode having a functional role in the case in which the user forcibly moves the anamorphic lenses L1, L2. In this case, the distances of the anamorphic lenses L1, L2 are transmitted to the anamorphic zoom distance counter 22 via the anamorphic zoom drive section 18. Then, the microprocessor 28 (an anamorphic magnification calculation section) finds out the anamorphic magnification based on the count value in the anamorphic zoom distance counter 22, calculates the aspect ratio coefficient ar of the image, which is the inverse of the anamorphic magnification, and then outputs (step S1 shown in FIG. 6) the aspect ratio coefficient ar to the image processing controller 26 via the mode selector 29.

Here, the image processing controller 26 adopts the aspect ratio coefficient ar input from the microprocessor 28 with priority, and then performs (step S2 shown in FIG. 6) the expansion process on the image so that the aspect ratio coefficient ar thereof becomes equal to the aspect ratio coefficient "par" of the liquid crystal panel 7. The image processing controller 26 outputs the image signal, on which the expansion process is thus performed, to the liquid crystal panel 7 via the panel driver 27, and the liquid crystal panel 7 displays (step S3 shown in FIG. 6) the image signal as the image.

Meanwhile, the microprocessor 28 transmits the signals to the respective focus drive sections 17, 14 of the anamorphic zoom optical system 11 and the master lens 10 at once, in order for adjusting the focus defocused due to the movement of the anamorphic lenses L1, L2. Specifically, the microprocessor 28 transmits the signals to the anamorphic focus drive section driver 19 and the focus drive section driver 15 of the master lens 10 in view of the relation between the anamorphic magnification and the focus set previously in the microprocessor 28, and the respective focus drive sections 17, 14 of the anamorphic zoom optical system 11 and the master lens 10 move (steps S4, S5 shown in FIG. 6) the lenses necessary for the focus adjustment. Similarly to the case of the first processing mode, also in this processing mode, it is preferable to count the present lens position using the anamorphic focus distance counter 20 and the focus distance counter 16, and to drive the lenses while performing feedback by the microprocessor 28.

It should be noted that it is possible to adopt a configuration in which the master lens 10, and the anamorphic lenses L1, L2 are interlocked with each other using, for example, a cam mechanism. In this case, either one of the anamorphic focus drive section 17 and the focus drive section 14 of the master lens 10 becomes unnecessary.

The image display in the second processing mode is completed through the course described above, thus the most appropriate image can be displayed on the screen 12.

It is preferable to adopt the configuration in which the second processing mode is not applied automatically in the case in which the picture type image signal having a standard of the aspect ratio is input. The reason therefor is that the forcible change in the aspect ratio of this type of image signal results in nothing but distortion of the original image. Therefore, it is preferable to apply the second processing mode to the image signal for a device the desktop size of which can freely be set such as a personal computer. Although not shown in FIG. 1, it is also possible to adopt a configuration of converting the aspect ratio coefficient ar output from the microprocessor 28 into a resolution value of the desktop of the personal computer, and then feeding the resolution value into the personal computer via a LAN, a serial bus such as USB, or the like, thereby interlocking with the anamorphic magnification. According to this configuration, it is also possible to change the desktop size of the personal computer in accordance with the change in the image size on the screen in an interlocking manner, thus the desktop of the personal computer with extremely high flexibility can be realized.

Although the two processing modes are hereinabove explained, it is also possible to adopt a configuration, for example, in which the mode selector 29 is controlled with a signal from an input section such as a switch, and the user can freely select the two processing modes. Alternatively, it is also possible to adopt a configuration in which whether the image signal input thereto is the picture type signal or the signal of the personal computer is discriminated, and the control circuit section 4 selects one of the two processing modes automatically. Alternatively, it is also possible to adopt a configuration in which a detection section for detecting the fact that the anamorphic lenses L1, L2 are moved forcibly has previously been provided, and the process automatically proceeds to the second processing mode if the forcible movement of the anamorphic lenses L1, L2 is detected.

According to the projector 1 of the present embodiment, since the image processing controller 26 performs the expansion process of the image in the vertical direction as shown, for example, in FIG. 4B, and the anamorphic zoom optical system 11 magnifies the image, which is obtained by the expansion in the vertical direction, in the horizontal direction on the liquid crystal panel 7, and then projects it on the screen, the image can be displayed on the entire screen without providing the blank area, thus the degradation in the resolution, the reduction of the life of the liquid crystal panel, and the degradation in the illumination efficiency can be prevented. Further, since the plane mirror or the like for switching the aspect ratio becomes unnecessary, the switching structure can be prevented from becoming complicated, thus growth in size of the projector can be prevented. Further, since the magnification of the image can be changed by the anamorphic zoom optical system 11, the projector capable of displaying high-resolution images corresponding to various image signals can be provided.

Second Embodiment

Hereinafter, a second embodiment of the invention will be explained with reference to FIGS. 7 and 8.

The projector according to the present embodiment is completely the same in the basic configuration as in the first embodiment, and is different therefrom in the point that an imaging element is provided.

Figure 7:
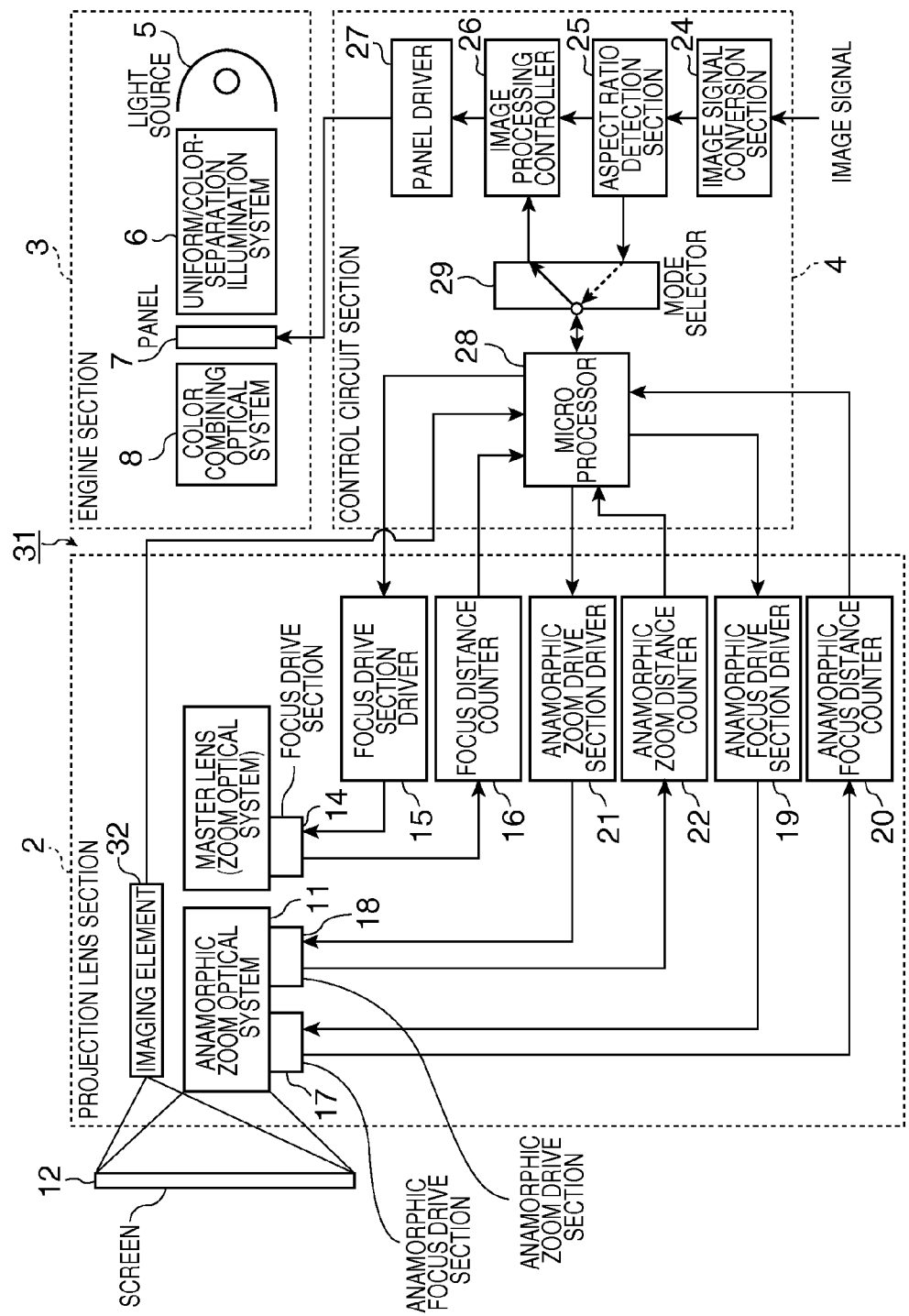
FIG. 7 is a schematic configuration diagram of a projector according to a second embodiment of the invention.
Figure 8:
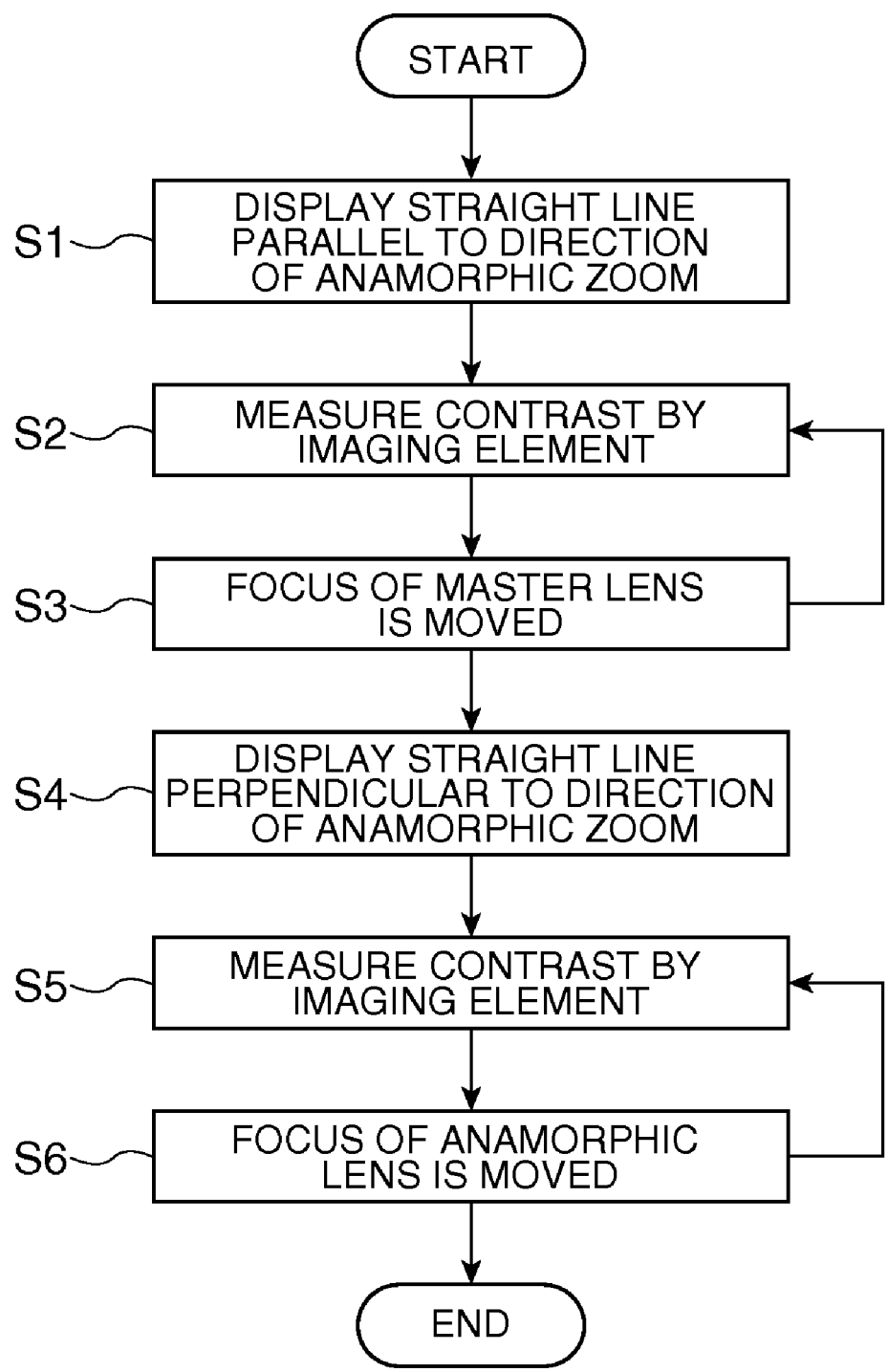
FIG. 8 is a flowchart for explaining one method for adjusting the focus.

FIG. 7 is a block diagram showing a schematic configuration of the projector according to the present embodiment. In FIG. 7, the constituents common to those shown in FIG. 1 are provided with the same reference numerals, and explanations therefor are omitted.

As shown in FIG. 7, the projector 31 according to the present embodiment is provided with the imaging element 32 for shooting the image on the screen 12, and has the configuration in which the image data taken by the imaging element 32 is input to the microprocessor 28. The microprocessor 28 performs the focus adjustment of the master lens 10 and the anamorphic zoom optical system 11 based on the image data.

The focus adjustment method of the present embodiment will be explained with reference to FIG. 8.

Since the anamorphic lenses L1, L2 each have large aberration in the zoom direction of the image, a straight line extending in a direction parallel to the zoom direction is displayed first (step S1 shown in FIG. 8) to perform the focus adjustment of the master lens 10. When the straight line in the direction parallel to the zoom direction is displayed, the straight line is shot by the imaging element 32, and then the microprocessor 28 calculates (step S2 shown in FIG. 8) the contrast ratio. Subsequently, after adjusting the focus (step S3 shown in FIG. 8) by moving the master lens 10, the procedure of shooting the straight line by the imaging element 32 and then adjusting the focus is repeated until the contrast ratio becomes the maximum.

Subsequently, a straight line extending in a direction perpendicular to the zoom direction is displayed (step S4 shown in FIG. 8) to perform the focus adjustment of the anamorphic lenses L1, L2. When the straight line in the direction perpendicular to the zoom direction is displayed, the straight line is shot by the imaging element 32, and then the microprocessor 28 calculates (step S5 shown in FIG. 8) the contrast ratio. Subsequently, after adjusting the focus (step S6 shown in FIG. 8) by moving the anamorphic lenses L1, L2, the procedure of shooting the straight line by the imaging element 32 and then adjusting the focus is repeated until the contrast ratio becomes the maximum.

Also in the present embodiment, there can be obtained an advantage, which is substantially the same as in the first embodiment, that there can be provided a projector capable of performing the high-resolution display in accordance with the image signal input thereto without causing the degradation in the resolution, the reduction of the life, and the degradation in the illumination efficiency, and with a simple aspect ratio switching mechanism. Further, in the case of the present embodiment, it becomes possible to automatically adjust the focus of each of the master lens 10 and the anamorphic zoom optical system 11 based on the shooting result of the imaging element 32 even in the case in which the zoom mechanisms of the master lens 10 and the anamorphic zoom optical system 11 are complicated, and it is difficult to interlock with each other, thus the high definition projector can be realized.

FIRST MODIFIED EXAMPLE

As a configuration to be attached to the projector according to the embodiments described above, it is also possible for the image processing controller to have a function of correcting the distortion of the image as much as the correction amount set previously in accordance with the shape of the screen.

In the case, for example, in which the anamorphic lens is used, there is caused in general the pin-cushion distortion in the projection image. It is desirable to correct this distortion in the case of displaying the image signal from the personal computer. However, in the case of displaying the picture type image signal, there are some cases in which it is rather preferable not to correct the distortion if a curved screen installed in, for example, a theater is used. In particular, in the case in which the input image signal is an image signal compliant with the Cinema Scope (with an aspect ratio of 2.35:1, a registered trademark owned by Twentieth Century Fox Film Corporation), the image with high definition in every corner of the screen can be realized by projecting the image with the distortion left. Therefore, by adopting the configuration capable of easily selecting the distortion correction preset amount as a design value stored previously in the device in the case of inputting the image signal requiring the distortion correction, such as an image signal from a personal computer, it becomes possible to realize the projector capable of appropriately coping with a wide variety of types of input signals.

SECOND MODIFIED EXAMPLE

Further, it is also possible for the anamorphic zoom optical system to be configured so as to be rotatable around the own optical axis with respect to the master lens 10.

For example, in the case of the lens configuration shown in FIGS. 2A through 2D, although it is possible to magnify the image in a certain specific direction, it is not possible to magnify the image in a direction perpendicular to the specific direction. The anamorphic lens capable of coping with two directions can also be designed, but causes the lens configuration to be complicated, and therefore, is unrealistic. Further, in the case in which an image signal with an aspect ratio smaller than the aspect ratio of the liquid crystal panel is input, it is required to set the anamorphic magnification to be equal to or smaller than one, which requires obtaining a large zoom ratio of the anamorphic lens, and therefore makes the design difficult. Therefore, by adopting the configuration in which the anamorphic zoom optical system can rotate around the own optical axis, it is possible to obtain a large vertical/horizontal zoom ratio while keeping the performance as the anamorphic lens, and the freedom can be enhanced.

In the case of adopting such a configuration in which the anamorphic zoom optical system can rotate around the own optical axis, it is preferable to set the aspect ratio of the liquid crystal panel to be 1:1. According to the configuration described above, it is possible to provide the same anamorphic magnification in both of the case in which the projector is mounted vertically when using the projector and the case in which the projector is mounted horizontally when using the projector, thus the projector having an arbitrary aspect ratio regardless of the posture of the projector can be realized. By attaching a weight or the like to the anamorphic zoom optical system as a device of rotating the anamorphic zoom optical system, the anamorphic zoom optical system rotates automatically in the case of changing the mounting posture of the projector, thus the same aspect ratio can be realized.

It should be noted that since the anamorphic magnification is inverted by the rotation of the anamorphic zoom optical system, it is required to transmit the rotation detection signal for indicating that the anamorphic zoom optical system has rotated to the microprocessor, thereby correcting the expansion process by the image processing controller.

Alternatively, it is also possible to adopt the configuration provided with a rotation drive section for automatically driving the anamorphic zoom optical system in accordance with the image signal input thereto. In the case in which the rotation drive section is provided, it is possible to realize a configuration in which the anamorphic zoom optical system is automatically rotated 90 degrees to set the anamorphic magnification to be equal to or larger than one when, for example, the anamorphic magnification becomes equal to or smaller than one as a result of the calculation of the anamorphic magnification along the first processing mode. According to this configuration, the range of the anamorphic magnification the anamorphic zoom optical system can cope with can be reduced, which is advantageous in cost, design, and performance.

THIRD MODIFIED EXAMPLE

Further, the following three types of positional relationships between the anamorphic zoom optical system and the master lens can be adopted.

Figure 9A:
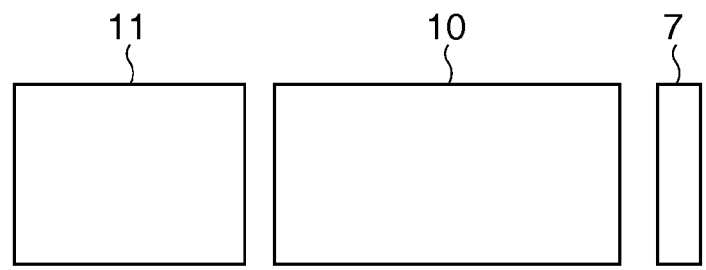
FIGS. 9A through 9C are diagrams showing a positional relationship between the master lens and the anamorphic zoom optical system.
Figure 9B:
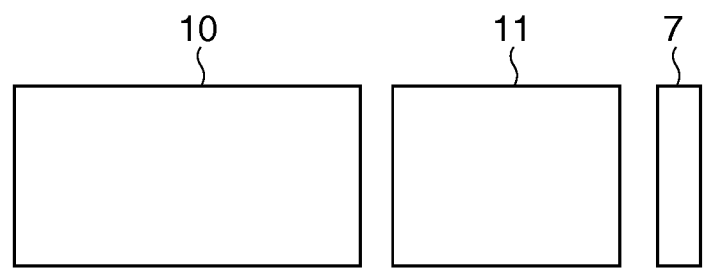
Figure 9C:
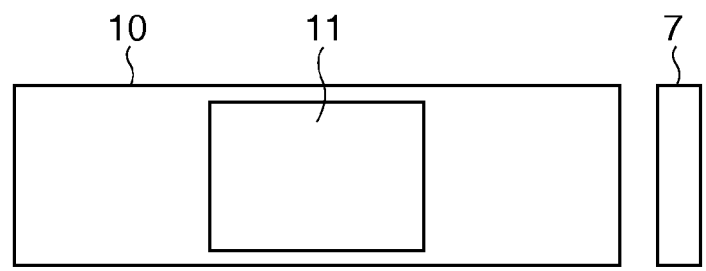

FIG. 9A shows a front converter system in which the master lens 10 and the anamorphic zoom optical system 11 are disposed in this order from the side closer to the liquid crystal panel 7 similarly to the embodiments described above, FIG. 9B shows a rear converter system in which the anamorphic zoom optical system 11 and the master lens 10 are disposed in this order from the side closer to the liquid crystal panel 7, and FIG. 9C shows a built-in system in which the anamorphic zoom optical system 11 is disposed in the lens group constituting the master lens 10.

It should be noted that the scope of the invention is not limited to the embodiments described above, but various modifications can be provided thereon within the scope or the spirit of the invention. For example, although in the embodiments described above an example of the projector using the three-panel type transmissive liquid crystal panels is described, it is also possible to adopt a projector using the three-panel type reflective liquid crystal panels, digital micromirror devices (DMD, (a trademark owned by Texas Instruments)), or the like as the light modulation element instead of the above configuration, the engine section is not particularly limited. Besides the above, detailed configurations of the device can accordingly be modified.

The entire disclosure of Japanese Patent Application No.2009-031840, filed Feb. 13, 2009 is expressly incorporated by reference herein.

What is claimed is:

1. A projector comprising:
   a light source;
   an image processing section adapted to perform an expansion process of an aspect ratio in either one of a horizontal direction and a vertical direction of an image to be formed by an image signal input;
   a light modulation element adapted to modulate light from the light source to form an image on which the expansion process is performed;
   a projection optical system adapted to project the image, formed by the light modulation element, on a projection surface; and
   an anamorphic zoom optical system adapted to be capable of changing a magnification ratio of the image with respect to a direction different from a direction, along which the expansion process is performed in the image processing section, out of the horizontal direction and the vertical direction.

2. The projector according to claim 1, further comprising:
an aspect ratio detection section adapted to detect an aspect ratio of the image signal input,
wherein the image processing section performs the expansion process of the image so that an aspect ratio of the image on which the expansion process has been performed and an aspect ratio of the light modulation element match with a result of the aspect ratio detection by the aspect ratio detection section.

3. The projector according to claim 1, further comprising:
an anamorphic magnification calculation section adapted to calculate a magnification ratio of the anamorphic zoom optical system based on a moving distance of a lens constituting the anamorphic zoom optical system,
wherein the image processing section performs the expansion process of the image based on a calculation result of the magnification ratio by the anamorphic magnification calculation section.

4. The projector according to claim 1, wherein
each of the projection optical system and the anamorphic zoom optical system is provided with a focus drive section adapted to adjust focus of the image.

5. The projector according to claim 4, further comprising:
a lens position detection section adapted to detect a position of a lens constituting each of the projection optical system and the anamorphic zoom optical system,
wherein each of the focus drive sections performs adjustment of the focus based on a result of the lens position detection by the lens position detection section.

6. The projector according to claim 4, further comprising:
an imaging section adapted to shoot an image projected on the projection surface,
wherein each of the focus drive sections performs adjustment of the focus based on a result of the shooting of the image by the imaging section.

7. The projector according to claim 1, wherein
the anamorphic zoom optical system is adapted to be capable of rotating around an own optical axis.

8. The projector according to claim 7, wherein
the aspect ratio of the light modulation element is 1:1.

9. The projector according to claim 1, wherein
the image processing section corrects distortion of the image as much as a correction amount set previously in accordance with a shape of the projection surface.

* * * * *